(12) United States Patent
Wakelin

(10) Patent No.: US 8,918,670 B2
(45) Date of Patent: Dec. 23, 2014

(54) ACTIVE LINK VERIFICATION FOR FAILOVER OPERATIONS IN A STORAGE NETWORK

(75) Inventor: Duncan Wakelin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1417 days.

(21) Appl. No.: 12/260,609

(22) Filed: Oct. 29, 2008

(65) Prior Publication Data

US 2010/0107000 A1   Apr. 29, 2010

(51) Int. Cl.
*G06F 11/00*   (2006.01)
*H04L 12/24*   (2006.01)
*H04L 29/08*   (2006.01)
*H04L 29/14*   (2006.01)
*G06F 11/20*   (2006.01)

(52) U.S. Cl.
CPC ........ *H04L 41/0654* (2013.01); *H04L 67/1097* (2013.01); *H04L 69/40* (2013.01); *G06F 11/201* (2013.01)
USPC ...................................................... 714/4.11

(58) Field of Classification Search
USPC ....................................................... 714/43, 4
See application file for complete search history.

(56) References Cited

U.S. PATENT DOCUMENTS

| | | | |
|---|---|---|---|
| 6,108,300 A * | 8/2000 | Coile et al. ..................... | 370/217 |
| 6,145,089 A * | 11/2000 | Le et al. ............................ | 714/4 |
| 6,581,166 B1 * | 6/2003 | Hirst et al. ........................ | 714/4 |
| 7,043,663 B1 * | 5/2006 | Pittelkow et al. ................. | 714/4 |
| 7,127,633 B1 * | 10/2006 | Olson et al. ....................... | 714/4 |
| 7,281,168 B1 * | 10/2007 | Coates et al. ................... | 714/43 |
| 7,284,147 B2 * | 10/2007 | Rao et al. .......................... | 714/4 |
| 7,380,163 B2 * | 5/2008 | Davies et al. ..................... | 714/9 |
| 7,574,630 B1 * | 8/2009 | Ranaweera et al. ............. | 714/43 |
| 2002/0169861 A1 * | 11/2002 | Chang et al. .................. | 709/223 |
| 2003/0018927 A1 * | 1/2003 | Gadir et al. ....................... | 714/4 |

* cited by examiner

*Primary Examiner* — Marc Duncan
(74) *Attorney, Agent, or Firm* — Trenner Law Firm, LLC; Mark D. Trenner

(57) ABSTRACT

Systems and methods for active link verification for failover operations in a storage network are disclosed. An exemplary method includes issuing a command from a first port of a storage device to a local network device in the storage network. The method also includes receiving a response to the command at the first port of the storage device from the local network device in the storage network. The storage device fails over to a second port of the storage device if no response is received at the first port of the storage device.

17 Claims, 3 Drawing Sheets

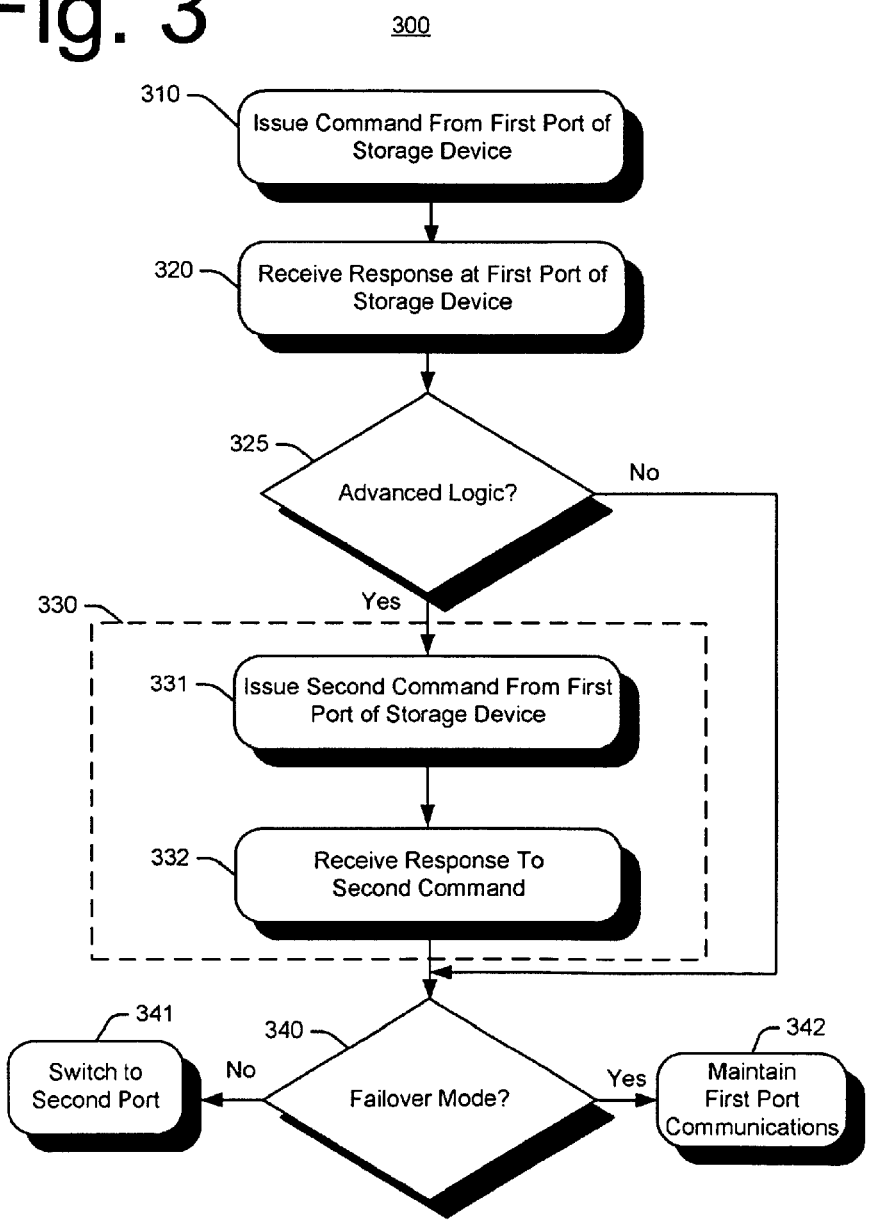

ACTIVE LINK VERIFICATION FOR FAILOVER OPERATIONS IN A STORAGE NETWORK

BACKGROUND

Remote storage may be implemented for computer systems wherein one or more computing device is provided access to one or more storage devices via a network. Remote storage offers many advantages, including providing access to one or more storage devices from multiple locations, upgrading/replacing storage devices without interrupting other data processing operations, and providing for failover strategies. Failover strategies in a storage network enable a computing device to continue accessing a storage device in the storage network via an alternate path if one path becomes disabled.

There are a wide variety of different types of failover strategies for storage networks. Some failover strategies are implemented manually, e.g., by a user reconfiguring a path to the storage device if the user is unable to access the storage device via the currently configured path. Such manual approaches can be time-consuming and require the user to understand at least the basic infrastructure of the storage network and how to reconfigure access via an alternate path. In addition, manual approaches are not suitable for adaptive infrastructures which are expected to be fully automated.

Automated failover strategies include direct host-to-target communication. In host-to-target communication, the computing device desiring access to the storage device may issue a high-layer communication to the storage device. If the computing device receives a reply from the storage device, the path is known to be working. If, however, the computing device does not receive a reply from the storage device, the path is assumed to have failed and the computing device automatically fails over to an alternate path.

Unfortunately, linking devices in the network may be inoperative at a higher communications level (e.g., at the software or firmware level) without interrupting the path at a lower physical level (e.g., at the circuit level). But because the computing device does not receive a reply from the storage device, the computing device unnecessarily fails over to the alternate path. In addition, high-level host-to-target communications can interrupt legitimate system drivers and software applications on the computing device.

BRIEF DESCRIPTION OF THE DRAWINGS

FIG. 3 is a flowchart illustrating exemplary operations which may be implemented for active link verification for failover operations in a storage network.

DETAILED DESCRIPTION

Systems and methods of active link verification for failover operations in a storage network are disclosed. In exemplary embodiments, low level protocol packets (also referred to herein as □heartbeats□ or □heartbeat commands□ and □heartbeat responses□) are issued between local and remote fabric devices (e.g., network switches) instead of end-devices (e.g., a client computing device). A response, or lack of response at the storage device, is used to verify whether the storage device should switch to an alternate or □failover□path.

Exemplary embodiments of active link verification for failover operations in a storage network may be implemented in either an active/passive or active/active configuration. Although not limited in scope, such embodiments are especially desirable in densely networked storage network installations and/or advanced storage network configurations, such as virtual LANs.

Systems and methods for active link verification for failover operations reduce or altogether eliminate manual failover approaches for storage networks. In addition, automated failover does not unnecessarily failover to the alternate path even if network linking devices become inoperative at a higher communications level (e.g., at the software or firmware level) if the path is still available at a lower physical level (e.g., at the circuit level). Furthermore, high-level host to target communications are not needed, and therefore the communications do not interfere with system drivers and software applications at the client computing device.

Figure 1:
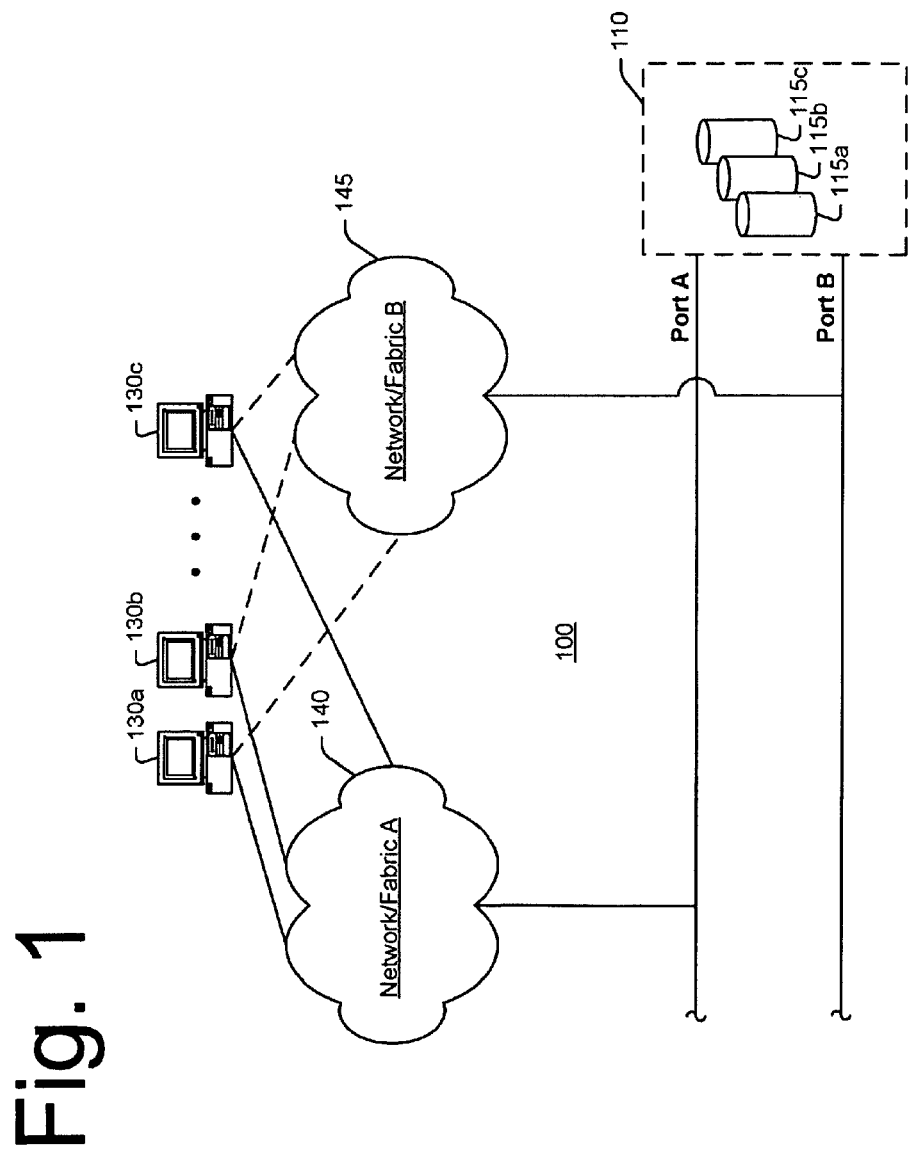
FIG. 1 is a high-level diagram of an exemplary network storage system which may implement active link verification for failover operations.

FIG. 1 is a high-level diagram of an exemplary network storage system 100 which may implement active link verification for failover operations. The network storage system 100 may include one or more storage device 110 (individual storage devices are illustrated by storage devices 115a-c). Although not required, the storage device 110 may be logically grouped into one or more virtual disks. Of course the network storage system 100 is not limited to any number or configuration of storage device 110.

The storage device 110 may be accessed by one or more client computing device 130a-c (also referred to as □clients□). In an exemplary embodiment, the clients 130a-c may be connected to network storage system 100 via a communications network 140 (Network A). An alternate path is illustrated via network 145 (Network B). The communications network 140, 145 may include one or more local area network (LAN) or network fabric. Of course any number of networks including active and/or failover paths may be implemented. Network A and Network B are shown only for purposes of illustration.

Before continuing, it is noted that the terms □client computing device□ and □client□as used herein refer to a computing device through which one or more users may access the storage device 110 via the network storage system 100. The computing devices may include any of a wide variety of computing systems, such as stand-alone personal desktop or laptop computers (PC), workstations, personal digital assistants (PDAs), or appliances, to name only a few examples. Each of the computing devices may include memory, storage, and a degree of data processing capability at least sufficient to manage a connection to the storage device 110 via network 140.

It is also noted that the storage device 110 may interface with the communications network 140, e.g., via a fully functional storage server with a processor, memory, network interfaces, and disk storage. The storage server runs a specialized software package which coordinates disk operations and presents the functionality of traditional attached-disk storage to clients 130a-c. Alternatively, the storage device 110 includes at least some form of computer-readable storage and at least some degree of processing capability to execute program code for active link verification for failover operations. In any event, the storage device 110 is able to provide a connection to any storage cell 115a-c. I/O requests (reads and writes) from the client are satisfied by relevant subsets of the storage cells 115a-c, which coordinate their data and operational states and determine the correct response.

Redundancy and recovery schemes may also be utilized to safeguard against the failure of any storage device 110. Remote storage may be used for mirroring data stored on one or more of the storage cells 115a-c. In an exemplary embodiment, remote storage may be physically located in close proximity to the storage device 110. In another exemplary embodiment, at least a portion of the remote storage may be ☐off-site☐or physically remote from the storage device 110, e.g., to provide a further degree of data protection.

Figure 2:
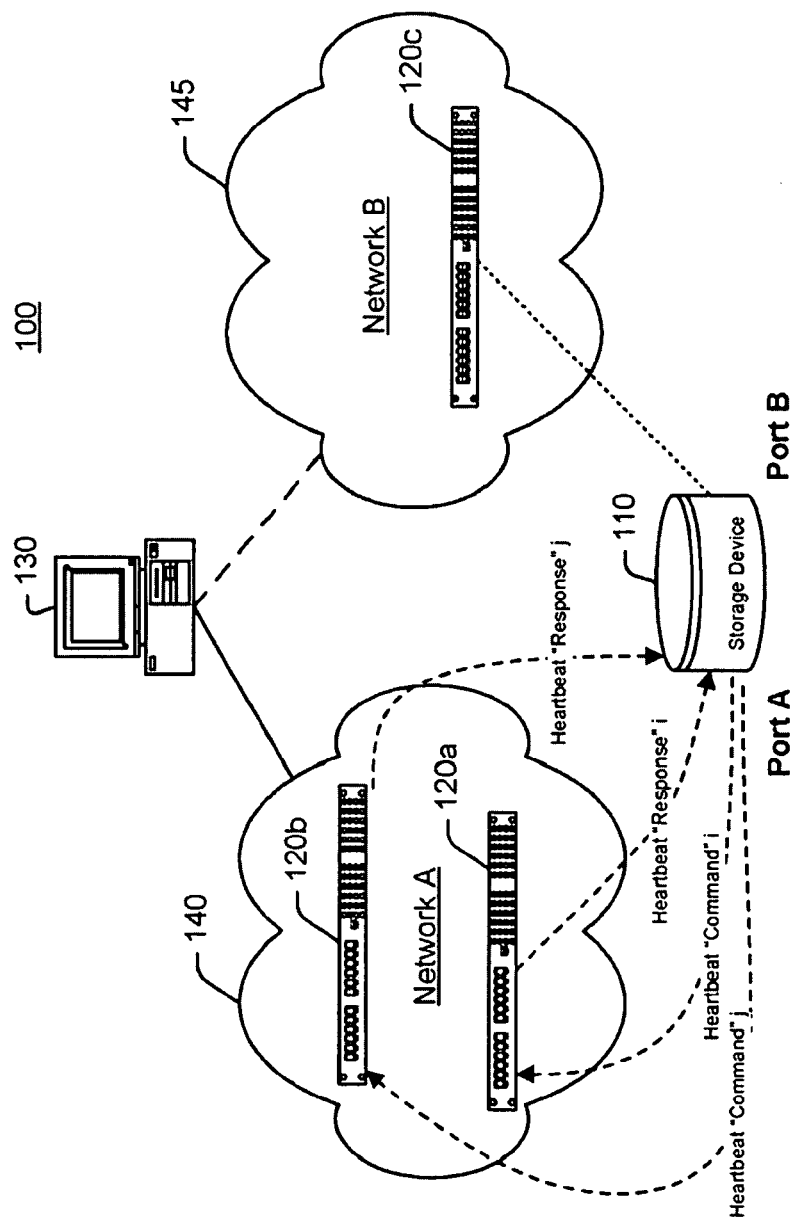
FIG. 2 is a high-level illustration of exemplary communications in a storage network which may be implemented for active link verification for failover operations.

FIG. 2 is a high-level illustration of exemplary communications which may be implemented for active link verification for failover operations in a storage network. As in FIG. 1, the network storage system 100 is shown including at least a first or primary communications network 140 and a second or failover communications network 145. Each communications network (or fabric) 140, 145 includes one or more network devices 120a-c, also referred to collectively as network devices 120. Network devices 120 may be implemented to provide a communications link between client computing device 130 (e.g., one or more of the clients 130a-c in FIG. 1) and storage device 110 in the storage network 100.

The term ☐network devices☐ 120 as used herein refers to a device for establishing, maintaining, and/or handling data communications in the storage network 100. Exemplary network devices 120 may include, but are not limited to, Ethernet and Fibre Channel switches, routers, hubs, and any other device capable of enabling/disabling ports based on the contents of packets and limits exchanges to the links where such exchanges are needed (e.g., another server computer in a peer-to-peer network).

It is noted that in switches, the protocol exchanges may be restricted to the specific links that the switches are configured and connected to. Alternatively, different tiers of switches may be implemented, including local switches (e.g., network device 120a) and non-local switches (e.g., network device 120b). It is noted that the term ☐local☐ as used with reference to switches means ☐one connection away,☐ whereas the term ☐non-local☐ as used with references to switches means ☐more than one connection away.☐

Bidirectional traffic transfer on the network ports may be enabled in accordance with recognized best practices. In an exemplary embodiment, Port A of the storage device 110 is enabled or "active". Port A is thus used for data communication. Client 130 connected to Network/Fabric 140 is able to communicate with the storage device 110 via Port A. Also in this embodiment, Port B is the failover port and is inactive or "dormant". Port B is not used for regular data communication and client 130 is unable to communicate with the storage device 110 via Port B during normal use. However, the storage device 110 may enable Port B and communications via Network/Fabric 145 in a failover mode.

During operation, storage device 110 may issue heartbeat commands via Port A to a local switch 120a. The local switch 120a in Network/Fabric A responds by sending heartbeat responses to Port A of the storage device 110. Heartbeat commands and responses by the local switch 120a are designated in FIG. 2 by the reference ☐i☐. A decision to failover may be based entirely upon the response at the local switch. Optionally, however, the storage device 110 may issue heartbeat commands via Port A to a non-local switch 120b. The non-local switch 120b in Network/Fabric A responds by sending heartbeat responses to Port A of the storage device 110. Heartbeat commands and responses by the non-local switch 120b are designated in FIG. 2 by the reference ☐j☐. In this case, the decision to failover using more advanced logic based on feedback from the local and/or non-local switches.

It is noted that in exemplary embodiments, the client 130 is not communicating directly with the storage device 110, but rather the storage device 110 is communicating with network devices 120. Network devices 120 are typically not capable of initiating ☐real☐ commands in response to SCSI commands. However, the network devices 120 are capable of responding to link service commands or similar low level protocol packets (also referred to as ☐heartbeat commands☐and ☐heartbeat responses☐).

For purposes of simplification, the heartbeat commands and heartbeat responses are shown in FIG. 2 as direct communication between the storage device 110 and the network device 120. In operation, however, the frames may be issued via one or more network device, which may then transmit the frames to one or more other network device.

In any event, the storage device 110 may use the heartbeat responses from the local switch 120a as an indication that Port A is fully operational. In addition, the storage device 110 may also use the heartbeat responses from the non-local switch 120b, or multiple instances of the heartbeat responses, as an additional indication that Port A is fully operational. If the storage device 110 does not positively identify that Port A is operating within the storage environment, then the storage device 110 enters a failover mode. In failover mode, the storage device 110 is reconfigured to use Port B for communications.

According to exemplary embodiments, there is no need to configure the client 130 to test and identify whether the storage device port is operational. In addition, the storage device 110 is less likely to failover to Port B unnecessarily due to a failure of a local link to the client 130, an overloaded client 130, operating system or application failures at the client 130, or other reasons unrelated to the functionality of the storage device port(s).

FIG. 3 is a flowchart illustrating exemplary operations which may be implemented for active link verification for failover operations in a storage network. Operations 300 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used for active link verification for failover operations in a storage network.

In operation 310, a command is issued from a first port of a storage device (e.g., to a local network device in the storage network). In operation 320, a response to the command may be received at the first port of the storage device (e.g., from the local network device in the storage network).

In operation 325 a decision is made whether to use advanced logic in the failover determination. If advanced logic is not used, operations 330 are bypassed. If the advanced logic is used, then operations 330 are implemented.

Operations 330 are optional (as indicated by the dashed box) and may be included in addition to the other operations. In operation 331, a second command is issued from the first port of the storage device (e.g., to a non-local network device). In operation 332 a response to the second command may be received at the first port of the storage device (e.g., from the non-local network device in the storage network).

In operation 340, a decision is made whether to enter failover mode. In operation 341, the storage device fails over to a second port of the storage device if no response to the commands issued in operation 310 (and/or optionally operation 331) is received at the first port of the storage device. Otherwise, the storage device maintains communications via the first port.

The operations shown and described herein are provided to illustrate exemplary implementations of active link verification for failover operations in a storage network. In addition, the operations are not limited to the ordering shown. Still other operations may also be implemented.

It is noted that the exemplary embodiments shown and described are provided for purposes of illustration and are not intended to be limiting. Still other embodiments are also contemplated.

The invention claimed is:

1. A method for active link verification for failover operations in a storage network, comprising:
  issuing a command from a first port of a storage device to a local network device in the storage network, the local network device being one connection away from the first port of the storage device;
  receiving a response to the command at the first port of the storage device from the local network device in the storage network, wherein the storage device fails over to a second port of the storage device if no response is received at the first port of the storage device; and
  preventing failover due to at least one of the following: a local link failure at a client computing device, an overloaded client computing device, and an operating system and/or application failure at a client computing device.

2. The method of claim 1 further comprising:
  issuing a second command from the first port of the storage device to a non-local network device, the non-local network device being more than one connection away from the first port of the storage device; and
  receiving a second response to the second command at the first port of the storage device from the non-local network device in the storage network, wherein the storage device fails over to a second port of the storage device if no response to both commands is received at the first port of the storage device.

3. The method of claim 1, further comprising restricting issuing the command from the first port of the storage device to network links that the first port is configured and connected to.

4. The method of claim 1, further comprising issuing the command from the first port of the storage device to different tiers of network devices.

5. A storage device configurable for operation with a local network device in a storage network, the storage device comprising:
  at least a first port and a second port; and
  program code executable at the storage device to cause:
  issuing a command from the first port to the local network device in the storage network, the local network device being one connection away from the first port of the storage device;
  failing over to the second port if no response is received to the command issued at the first port; and
  preventing failover due to at least one of the following: a local link failure at a client computing device, an overloaded client computing device, and an operating system and/or application failure at a client computing device.

6. The storage device of claim 5, wherein the program code executable at the storage device further causes:
  issuing a second command from the first port of the storage device to a non-local switch, the non-local network device being more than one connection away from the first port of the storage device; and
  receiving a second response to the second command at the first port of the storage device from the non-local network device in the storage network.

7. The storage device of claim 6, wherein communication fails over to the second port if no response to both commands is received at the first port.

8. The storage device of claim 6, wherein the first and second commands are heartbeat commands.

9. The storage device of claim 6, wherein the first and second commands are link service commands.

10. The storage device of claim 6, wherein the local and non-local network devices are network switches.

11. The storage device of claim 5, wherein the program code reduces unnecessary failover due to a condition at a client computing device.

12. The storage device of claim 5, wherein the second port is available to a client computing device in a failover mode.

13. The storage device of claim 5, wherein the program code is restricted to issuing the command from the first port of the storage device to network links that the first port is configured and connected to.

14. The storage device of claim 5, wherein the program code issuing the command from the first port of the storage device, issues the command to different tiers of network devices.

15. A system for active link verification for failover operations in a storage network, comprising:
  means for issuing a heartbeat command from a first port of a storage device; and
  means for receiving a response to the heartbeat command at the first port of the storage device from a local network device in the storage network, the local network device being one connection away from the first port of the storage device, wherein the storage device fails over to a second port of the storage device if no response is received at the first port of the storage device; and
  means for preventing failover due to at least one of the following: a local link failure at a client computing device, an overloaded client computing device, and an operating system and/or application failure at a client computing device.

16. The system of claim 15 further comprising:
  means for issuing a second heartbeat command from the first port of the storage device; and
  means for receiving a second response to the second heartbeat command at the first port of the storage device from a non-local network device in the storage network, the non-local network device being more than one connection away from the first port of the storage device, wherein the storage device enters a failover mode if no response to the heartbeat commands is received at the first port of the storage device.

17. The system of claim 15, wherein the means for issuing the heartbeat command from the first port of the storage device, issues the heartbeat command to different tiers of network devices.

\* \* \* \* \*